United States Patent [19]

Imran

[11] Patent Number: 4,851,652

[45] Date of Patent: Jul. 25, 1989

[54] ELECTRONIC LOCK BOX, ACCESS CARD, SYSTEM AND METHOD

[75] Inventor: Mir A. Imran, Palo Alto, Calif.

[73] Assignee: DataTrak, Inc., Mountain View, Calif.

[21] Appl. No.: 184,204

[22] Filed: Apr. 20, 1988

[51] Int. Cl.$^4$ .............................................. G06K 5/00
[52] U.S. Cl. ................................... 235/382; 235/382.5
[58] Field of Search ............................. 235/382, 382.5

[56] References Cited

U.S. PATENT DOCUMENTS 4,609,780  9/1986  Clark ................................ 235/382 X Primary Examiner—Harold I. Pitts
Attorney, Agent, or Firm—Flehr, Hohbach, Test, Albritton & Herbert

[57] ABSTRACT

A lock box in a secure entry system for use with a source of DC power having high frequency pulse width modulation thereon comprising a housing and a key container mounted in said housing movable between accessible and inaccessible positions. Circuitry is provided within the housing for controlling the movement of the key container and is adapted to be connected to the source of DC power. The circuitry includes a filter having a capacitor. The circuitry is capable of receiving the high frequency pulse width modulated DC power. The capacitor serves to supply at least some of the power required by the circuitry during the time the pulse width modulation is occurring on the DC power supplied. A latch mechanism is provided to prevent opening of the key container to an accessible position by hammer blows applied to the housing.

33 Claims, 6 Drawing Sheets

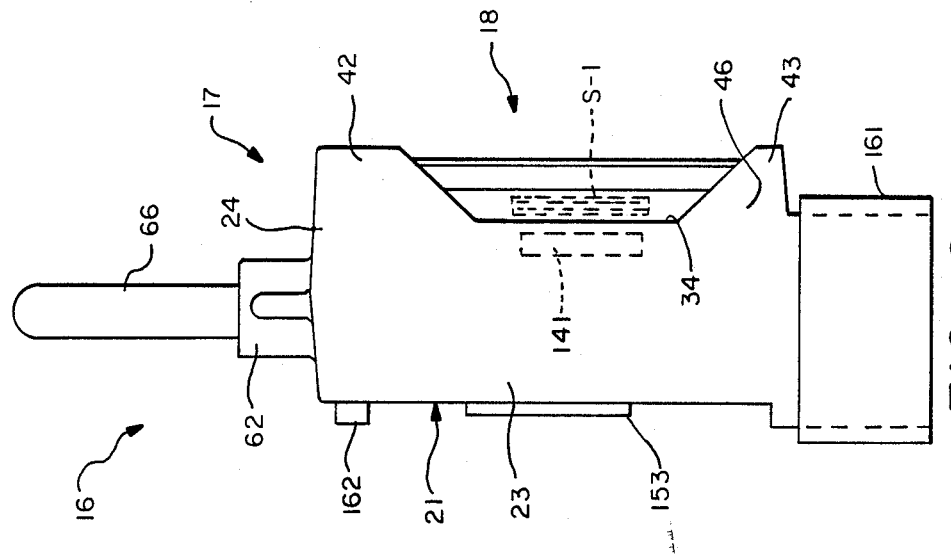
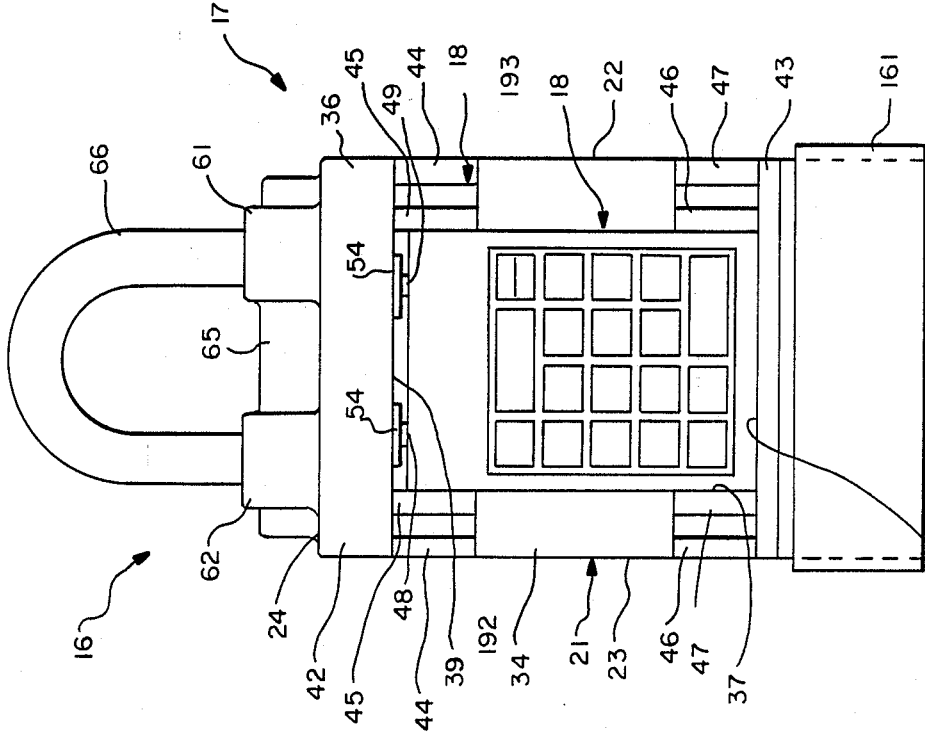

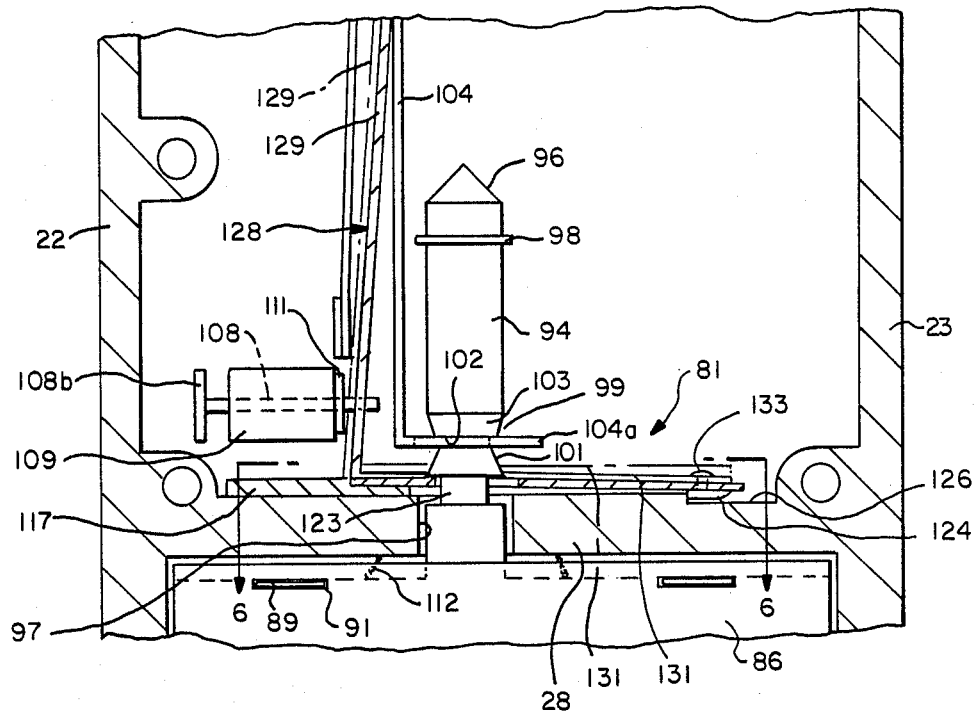
FIG.—5
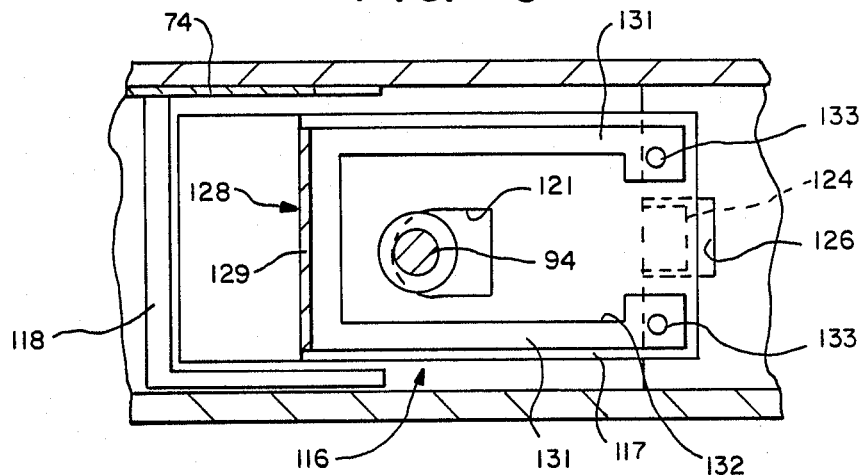
FIG.—6

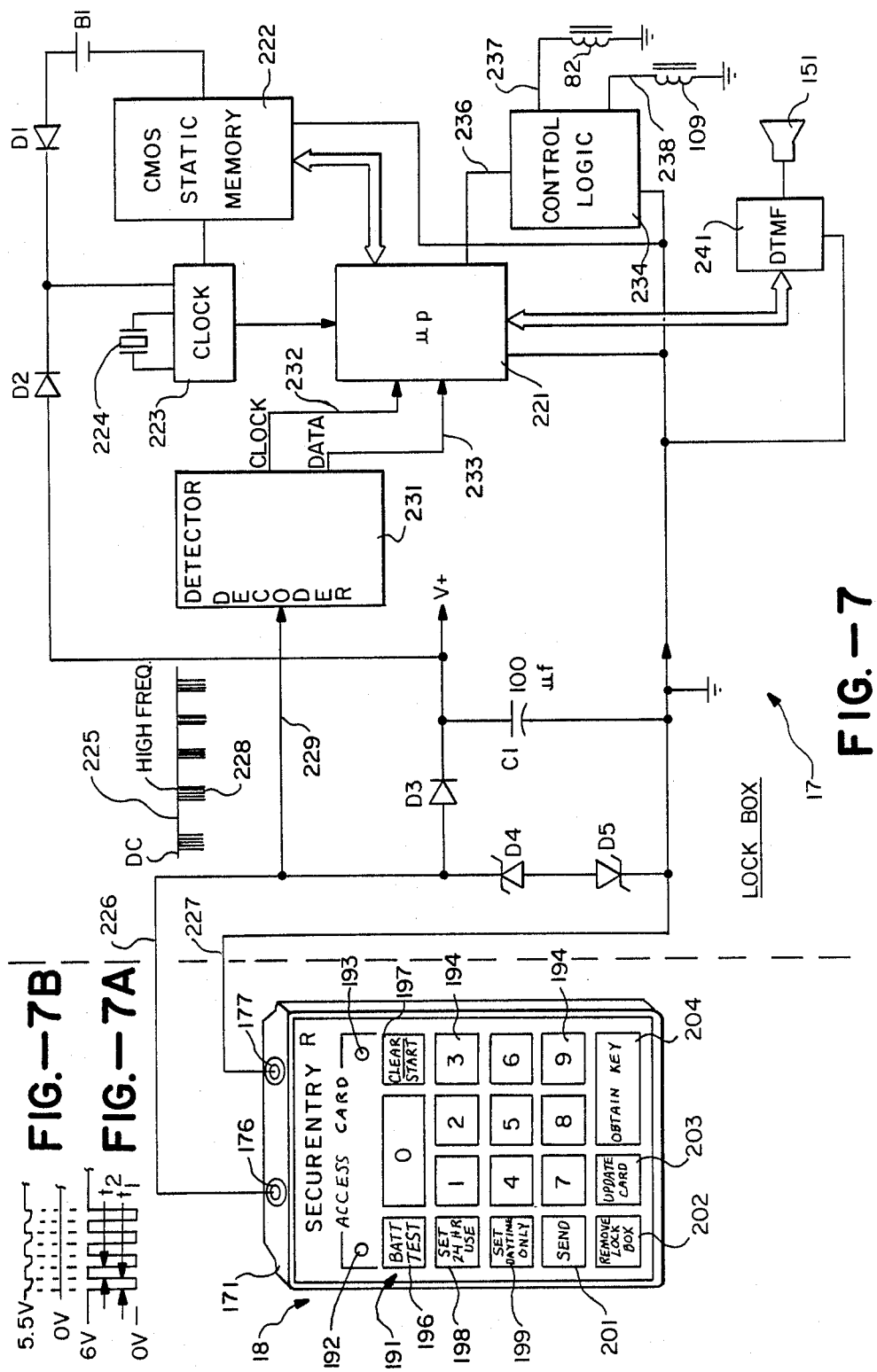

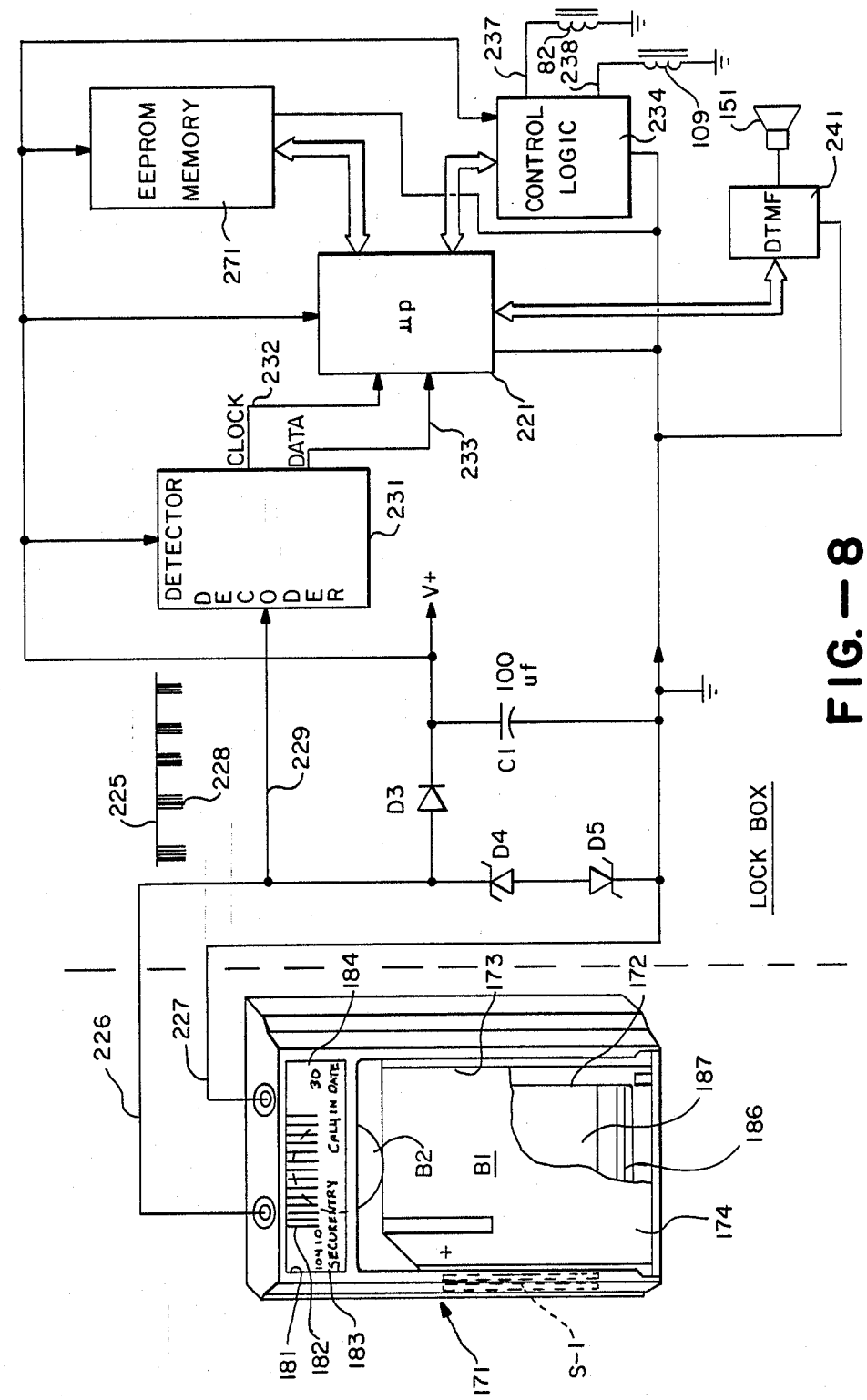
FIG.—8

ELECTRONIC LOCK BOX, ACCESS CARD, SYSTEM AND METHOD

This invention relates to an electronic lock box, access card, system and method.

BACKGROUND OF THE INVENTION

In U.S. Pat. No. 4,609,780 there is disclosed an electronic secure entry system, apparatus and method. In that apparatus and system, a battery is provided in the apparatus and system for operating the electronics within the lock box. A card is provided for use with the lock box. In one embodiment, a keyboard is provided as an integral part of the lock box in which the private code of the user can be inserted. In another embodiment a card is provided which is separate from the lock box and which can be utilized to insert a private code by communicating with the electronics in the box by sensor coils carried by the box. In co-pending application, Ser. No. 899,533, filed Aug. 22, 1986 there is disclosed an electronic access card which can be utilized with a lock box of the type described in U.S. Pat. No. 4,609,780, but which carries its own electronics and a battery type power supply. In application Ser. No. 899,338 filed Aug. 22, 1986 there is disclosed an electronic access card of the type disclosed in application Ser. No. 899,533 but with a visual display. In connection with the foregoing, it has been found that it is desirable to provide additional features for an electronic lock box and access card which are not within the capabilities of the lock box and access cards of the type hereinbefore disclosed. As for example, it is desirable to provide a access card which has minimal, if any, power requirements when it is not being operated. There is therefore a need for a new and improved electronic lock box, access card, system and method.

OBJECTS OF THE INVENTION

In general, it is an object of the present invention to provide an electronic lock box, access card, system and method in which the power required for operating the lock box is substantially supplied from the power supply in the access card.

Another object of the invention is to provide a lock box, access card, system and method in which the timekeeping function is supplied by the access card.

Another object of the invention is to provide a lock box, access card, system and method in which information is conveyed by the use of high frequency pulse width modulation of the DC power.

Another object of the invention is to provide a lock box, access card, system and method of the above character in which modulation is in the form of pulse width modulation.

Another object of the invention is to provide a lock box for use in a secure entry system in which the lock box is provided with safety means to prevent access to the container in the lock box by hammer blows applied to the lock box.

Another object of the invention is to provide a secure entry system having lock boxes and access cards and in which the power supply is provided in the access card and in which normally open switch means is provided in the access card for preventing power from being supplied by the access card until the access card is mated with a lock box.

Another object of the invention is to provide a access card for use in a secure entry system in which the access card is provided with the sole timekeeping function.

Another object of the invention is to provide a access card for use in a secure entry system in which the access card is provided with the sole power supply.

BRIEF DESCRIPTION OF THE DRAWINGS

Additional objects and features of the invention will appear from the following description in which the preferred embodiments are set forth in detail in conjunction with the accompanying drawings.

FIG. 1 is a front elevational view of a lock box with a access card disposed therein incorporating the present invention.

FIG. 2 is a side elevational view of the lock box and access card shown in FIG. 1.

FIG. 5 is an enlarged cross-sectional view of a portion of the lock box shown in FIG. 3.

FIG. 6 is a cross-sectional view taken along the line 6—6 of FIG. 5.

FIG. 7 is a block diagram of the electronics utilized in the lock box using a CMOS memory with a keep alive battery and showing the manner in which it is connected to the access card.

FIG. 7A is a curve showing high frequency pulse width modulation applied to the D.C. voltage utilized in the lock box and access card shown in FIG. 7.

FIG. 7B is a curve showing the voltage across the capacitor C1 in the lock box in FIG. 7.

FIG. 8 is a block diagram of an alternate embodiment of the electronics utilized in the lock box using a EEPROM memory with no battery in the lock box and showing it connected to the access card and in which the access card is shown with the rear cover removed.

DESCRIPTION OF THE PREFERRED EMBODIMENT

Figure 4:
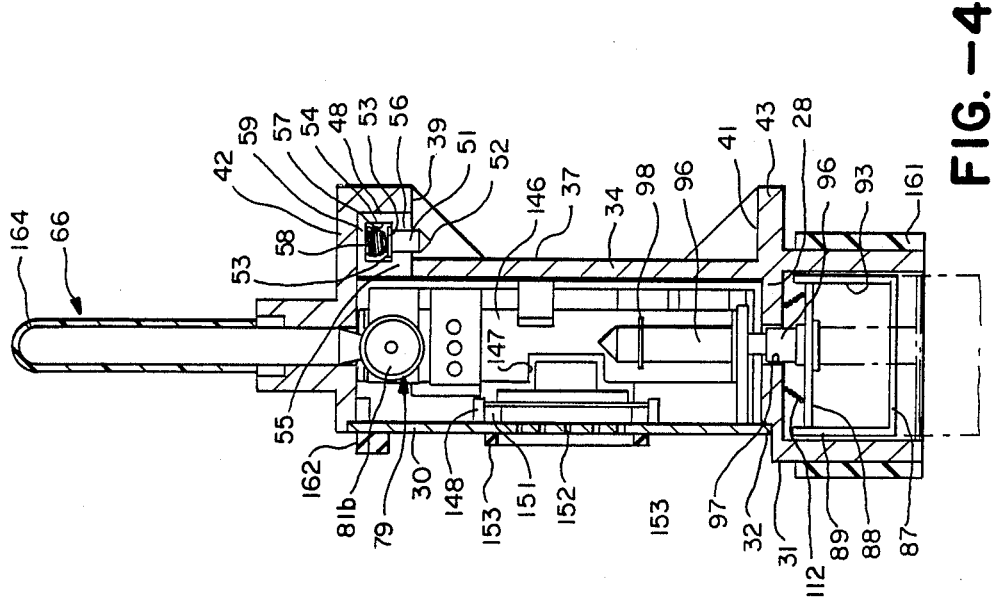
FIG. 4 is a side elevational view in cross section of the lock box shown in FIG. 2 and showing in broken lines the position of the key container in an open position.
Figure 3:
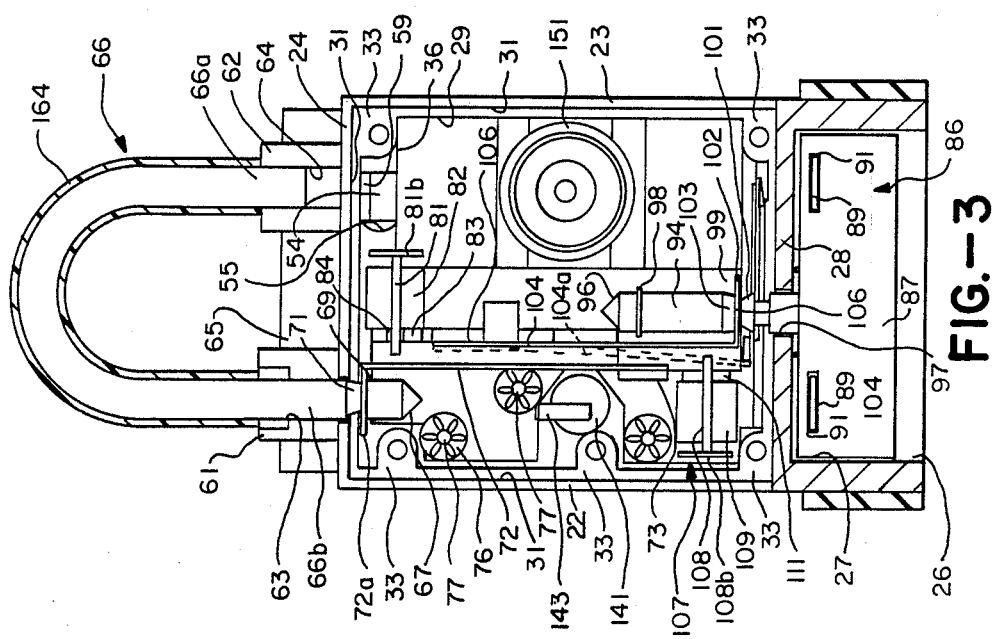
FIG. 3 is a rear elevational view partially in cross section of the lock box shown in FIGS. 1 and 2 with the rear cover removed.

In general, the secure entry system of the present invention is comprised of a plurality of lock boxes, each having housing and a container therein movable between accessible and inaccessible positions. Circuitry is provided within the housing for controlling the movement of the key container. A plurality of access cards are provided. Each access card has a keyboard. A battery is mounted in the access card and electronic circuitry is provided in the access card coupling the battery to the keyboard means and means is carried by each lock box and by each access card for establishing electrical contact between the access card and the box for supplying power from the battery in the access card to the circuitry in the lock box to operate the circuitry in the lock box.

More particularly, as shown in the drawings FIGS. 1-7, the electronic lock box and access card system 16 consists of an electronic lock box 17 and a access card 18 which as shown in FIG. 1 can be disposed in the lock box 17 and is removably mounted therein.

The electronic lock box 17 consists of a housing formed of a suitable material such as die cast zinc or aluminum. The housing 21 is provided with parallel spaced apart side walls 22 and 23 and a top wall 24. The bottom side of the housing 21 is provided with a rectangular opening 26 which opens into a rectangular box-shaped recess 27 that extends to an intermediate wall 28 of the housing 21 which is spaced apart and parallel to the top wall 24. The housing 21 is provided with a rectangular opening 29 which is closed by a cover plate 30 seated in a generally rectangular recess 31 which is formed in the side walls 22, 23, the top wall 24 and in the intermediate wall 28. The cover plate 30 is held in place by suitable means such as non-removable screws 32 threaded into bosses 33 formed in the housing 21.

The housing 21 is also provided with a front wall 34 which extends generally in a plane spaced apart from and parallel to the rear cover plate 33. The front wall 34, the side walls 22 and 23 and the cover plate 30 define a generally rectangular compartment 36 accessible through the rectangular opening 29. A forwardly facing recess or cavity 37 which has a generally rectangular configuration is provided in front of the front wall 34 and is adapted to receive the access card 18. The rear side of the recess or cavity 37 is formed by the front wall 34. Upper and lower walls 39 and 41 extending perpendicular to the front wall 34 define the upper and lower extremities of the recess or cavity 37. The walls 39 and 41 are provided respectively by upper lower protrusions 42 and 43 formed as an integral part of the housing 21. The sides of the recess or cavity 37 are open for a reason hereinafter described. However, the upper and lower extremities of the sides of the recess 37 are closed off by upper spaced apart parallel ribs 44 and 45 and lower spaced apart parallel ribs 46 and 47. As shown particularly in FIG. 1, these ribs 42, 43, 46 and 47 serve to retain the access card 18 within the recess or cavity 37 when the access card is removably positioned in the lock box 17 as hereinafter described.

Spring loaded contacts 48 and 49 are carried by the housing 21. The contacts 48 and 49 are comprised of pins 51 which are provided with conical tips 52 and a flanged head 53. The pins are seated in a block 54 of a suitable insulating material such as a plastic. The pins 51 extend downwardly through holes 56 provided in the blocks 54 and have the flanged heads 53 disposed within recesses 57 also provided in the block 54. The blocks 54 are placed in the housing 21 through recesses 55 extending from the rear which are formed in the upper protrusion 42. Springs 58 are disposed in the recesses 57 and yieldably urge the pins 51 in a downward direction. The upper extremities of the springs 58 engage inserts 59 formed of a suitable insulating material so that the springs 58 and the pins 51 are insulated from the housing 21.

The spring-loaded contacts 48 and 49 as shown, are adapted to be engaged by the access card 18 to make electrical contact therewith. Once the access card 18 has been slid into the cavity or recess 37 it will be retained therein by the spring-loaded contacts as well as by the ribs 44, 45, 46 and 47. Because of the sides of the recess 37 are open, the access card 18 can be readily engaged by the hands from the sides and pushed upwardly against the spring loaded contacts to remove it from the recess 37 when desired.

The housing 21 is provided with upstanding generally cylindrical bosses 61 and 62 formed integral with the top wall 24. The bosses 61 and 62 are provided with cylindrical holes 63 and 64 with a reinforcing rib 65 therebetween. The holes 63 and 64 are adapted to receive a U-shaped shackle 66. As can be seen one end 66a of the shackle 66 extends into the hole 64 and terminates in a position above the wall 24. The other end 66b of the shackle 66 extends through the hole 63 and through the top wall 24 and into the compartment 36. The end 61b is provided with a conical tip 67 and with a recess 68 which is spaced above the conical tip 62. The recess 68 is defined by a generally flat surface 69 and a truncated conical surface 71. The recess 68 is adapted to receive the free end of an L-shaped leaf spring 72.

The lower extremity of the L-shaped leaf spring 72 is secured to an upstanding ear 73 formed on a sheet metal chassis 74 which has a generally L-shaped configuration. The chassis 74 is secured within the compartment 36 adjacent the side wall 31 and secured to the housing 21 by suitable means such as push nuts 76 engaging posts 79 formed integral with the housing. The lower extremity of the leaf spring 72 is secured to the ears 73 by suitable means such as rivets (not shown). The leg portion 72a of the leaf spring 72 is provided with a hole 78 through which the portion 66b of the shackle 66 extends. The spring force normally applied by the leaf spring 72 is such that the leg portion 72a is normally engaged by the flat 69 provided on the portion 66b of the shackle 66 and serves to normally retain the shackle 66 in a latched position so that it cannot be removed from the housing 21.

Solenoid operated means 79 is provided for moving the leaf spring 72 from the normal latched position to an unlatching position and consists of a plunger 81 which is movably mounted in a coil 82. The coil 82 is secured to an upstanding ear 83 provided on the chassis 74 by suitable means such as screws (not shown). The plunger 81 extends through a hole 84 provided in the ear 83 and is adapted to engage the leaf spring 72 to move the upper extremity of the same to the left as viewed in FIG. 3 to move the leaf spring to an unlatched disengaging position in which the hole 78 is moved into alignment with the portion 66b of the shackle 66 permitting the shackle 66 to be removed from the housing 21. The plunger 81 is provided with a head portion 81b which limits the travel of the plunger so as to prevent the plunger from moving the leaf spring into a position which would move the hole 78 out of registration with the portion 66b of the shackle 66. After the solenoid 79 is deenergized it returns to its normal position, permitting the leaf spring 72 to return to its normal latching position. When it is desired to reinsert the shackle 66, the conical tip 67 will cam the leaf spring 72 out of the way to permit the portion 66b of the shackle to enter the hole 78 before it again seats in the recess 68 as the shackle 66 is pushed downwardly into the housing 21.

A key container 86 which can serve as access means is removably mounted in the rectangular recess 27 provided in the bottom of the housing 21. The key container 86 is formed of a suitable material such as chromium plated steel and is formed of a U-shaped member 87. A top plate 88 is mounted in the upper extremities of the U-shaped member 87 in a suitable manner. Thus by way of example, the top plate 88 can be provided with spaced apart ears 89 provided on opposite sides of the same which extend through slots 90 and 91 provided in the U-shaped member 91. The U-shaped member 91 with the top plate 88 forms the key container which is open at opposite ends and provides a space 93 therein which is adapted to receive one or more keys of a conventional type.

An upstanding pin 94 is mounted in the top plate 88 by suitable means such as a press fit. The pin 94 is provided with a conical tip 96 adapted to extend through a hole 97 provided in the intermediate wall 28. A C-ring 98 is mounted on the pin 94 adjacent the conical tip 96. The pin 94 is also provided with an annular recess 99 which is formed by a tapered or truncated conical surface 101 which adjoins a chamber 103. A flat surface 102 is provided as a part of the recess 99 and is adapted to be engaged by a leg portion 104a of an L-shaped leaf spring 104. The leg portion 104a is provided with a hole 105 through the pin 94 is adapted to extend. The leaf spring 104 has its upper extremity secured to an ear 106 provided on the chassis 74 by suitable means such as rivets (not shown).

Solenoid operated means 107 is provided for moving the leaf spring 104 between pin latching and pin unlatching positions and consists of a plunger 108 which is mounted in a coil 109 secured to another ear 111 provided on the chassis 74 by suitable means such as screws (not shown). When the solenoid 107 is energized, the plunger 108 is moved to the right of FIG. 3 to engage the leaf spring 104 to move it from the dotted line position shown in FIG. 3 to the solid line position and from a latched to an unlatched position permitting the key compartment 87 to be moved downwardly under the force of a coil spring 112 provided on the pin 94 disposed between the top wall 88 of the key container 86 and the lower or bottom side of the intermediate wall 28. The spring 112 yieldably urges the key container or access means 86 from an inaccessible position to an accessible position as shown by the dotted lines in FIG. 4 to permit removal of a key or keys from the recess or compartment 93. Outward movement of the key container 86 is limited when the ring 98 is engaged by the leg portion 104a of the leaf spring 104. This permits the key container to be moved into a position so that the keys contained within the space 93 are readily accessible while still preventing the key container from being separated from the housing 21.

Additional safety latch means 116 is provided for preventing the key container from being opened by tampering. The safety latch means 116 consists of a safety latch plate 117 slidably mounted on top of the intermediate wall 28 and being generally confined for movement from one side to the other of the housing 21 and being captured by an L-shaped member 118 provided as a part of the chassis 74. The latch plate 117 is generally rectangular in shape as shown in FIG. 6 and is provided with a substantially centrally disposed hole 121 which is generally rectangular in configuration but which has one side which is facing the sidewall 22 which has a semi-circular configuration. The pin 94 extends through the hole 101 and is provided with an annular recess 123 which has straight sides in which the safety latch plate 117 travels so that the latch plate 117 can move between pin engaging and pin disengaging positions with respect to the cutout 121 and the annular recess 123. The forward extremity of the latch plate 117 is provided with a downwardly extending protrusion 124 which has been formed in the latchplate that is adapted to seat in a cutout or recess 126 formed in the intermediate wall 28 of the housing 21. Means is provided for urging the forward extremity of the latch plate 117 in a downward position as viewed in FIG. 5 and also for yieldably urging the latch plate 117 to the left as viewed in FIG. 5 and consists of a large L-shaped leaf spring 128 which has a leg 129 which is secured to the ear 107 by suitable means such as rivets (not shown). The leaf spring 128 is also provided with another leg 131 which overlies the latch plate 117 and is provided with a large rectangular cutout 132 through which the pin 96 extends. The outer extremities of the leg 131 are secured to the forward extremity of the latch plate 117 by suitable means such as rivets 133. The leaf spring 128 is provided with a hole 134 through which the plunger 108 for operating the leaf spring 104 extends.

The operation of the safety latch means 116 may now be briefly described as follows. If someone is attempting to tamper with the lock box 117 in order to gain access to the key container or key compartment 86 by striking the lock box with a hammer such efforts will be futile because of the operation of the safety latch means. In the event a hammer blow is placed on the right hand side of the housing 21, as for example, against the side wall 23 of the housing as shown in FIG. 5, the hammer blow will accelerate the housing to the left as viewed in FIG. 5. When this occurs, the inertia of the mass of the safety latch plate 117 inhibits movement of the latch plate 117 to the left with the housing. Thus, as the housing moves to the left, the projection or protrusion 124 carried by the latch plate 117 will drop into the recess 126 provided in the housing. At the same time the pin 94 moves in the cutout 121 in the latch plate 117 so that the flat surface 102 carried by the pin 94 overlies the upper surface of the latch plate 117. This will prevent the pin 96 from becoming disengaged in the event the force supplied by the hammer blow is sufficient to cause the lower extremity of the leaf spring 104 to be accelerated to the right as viewed in FIG. 5 because of its mass to release the pin 96. Thus it can be seen that even if this should occur, the safety latch plate 117 because of its greater mass than the leaf spring 104 and its associated inertia will move to a latching position with respect to the recess 126 before any unlatching can occur with respect to the leaf spring 104 and the pin 96.

In the event that the housing 21 has been struck with a hammer blow which is sufficient to cause operation of the safety latch means 116, access to the key container 86 cannot be obtained until the safety latch means has been released. This can be readily accomplished merely by pushing up on the key container 86 in FIG. 5. As soon as this upward movement commences, the leaf spring 104 will snap into place in the recess 99 to again latch the pin 96 and the key container 86 in a closed or inaccessible position. This latching of the leaf spring 104 will occur prior to unlatching of the safety latch means 116 because of the additional clearance provided in the annular recess 123. Continued upward movement of the key container 86 with the pin 96 thereon causes the enlarged portion of the pin 96 to come into engagement with the safety latch plate 117 to move the protrusion 124 carried thereby out of the recess 126. As soon as this occurs, the yieldable force provided by the leaf spring 128 moves the leg 131 and the protrusion 124 carried thereby to the dotted line position shown in FIG. 5 and permitting movement of the latch plate 117 to the left with respect to the housing 21 under the force of the leaf spring 128 so that the surface 102 of the pin 94 no longer overlies the latch plate 117. Thus it can be seen that the key container latch is reset before the safety latch 116 is reset.

The safety latch 116 remains in this position throughout operation of the electronic lock box and only comes into play when a hammer blow of sufficient force strikes the right-hand side of the housing 21 as viewed in FIG. 5. Hammer blows into other parts of the housing 21 in different directions will not and cannot cause accidental opening of the key container latch 86 because the forces would be in the wrong direction to cause the leaf spring 104 to release the pin 94.

The safety latch means has been designed so that it actuate with a relatively low force so that it is sure to become effective before any force can be applied which would be efficient to cause release of the key container latch. Thus the safety latch means serves as means for providing inadvertent opening of the key container by tampering. The safety latch means is constructed in such a manner so that it can be readily reset.

The lock box 17 and the access card 18 are provided with cooperative switch means for connecting the battery in the access card 18 to the circuitry in the access card when the access card is inserted into the lock box 17. Such means consists of a circular permanent magnet 141 which is seated in a recess 142 provided in the chassis 74. The magnet 141 is held in place by a tab 143 forming a part of the chassis 74. Because the housing 21 is formed of a non-magnetic material, magnetic lines of force from the magnet 141 pass through the front wall 34 of the housing 21 and are adapted to operate a read switch S-1 provided in the access card 18 (see FIG. 2).

An encapsulated electronics module 146 is provided in the compartment 36. It is provided with a printed circuit board (not shown) which is encapsulated therein. The electronics module 146 is provided with recesses 147 and 148 which are formed to accommodate a speaker 151 mounted on the rear cover plate 30. Holes 152 are provided in the cover plate 30 to permit the transmission of sound therethrough from the speaker 151. A circular ring 153 of a suitable resilient material such as rubber is mounted on the exterior side of the cover plate 30.

Means is provided for preventing the lock box from scratching or marring doors and other objects on which the lock box is hung. Such means takes the form of a guard 161 formed of a suitable material such as rubber or plastic which surrounds the lower extremity of the housing 21 as shown particularly in FIGS. 3 and 4. A bumper strip 162 is provided on the exterior surface of the cover plate 30 near the top thereof and is also formed of a suitable material such as rubber or plastic. A shroud 164 encloses the exposed portion of the shackle 66 exterior of the boss and is also formed of a suitable material such as a transparent plastic.

The access card 18 is provided with a molded plastic case 171 which has a rear removable cover plate 172. The case 171 encapsulates a printed circuit board (not shown). As shown in FIG. 8, a battery compartment 173 has been provided within the case 171 and is of a size so that it is capable of receiving an alkaline battery of J size providing a six volt output and having a capacity of 500 miliamphere hours. As also shown in FIG. 8, the reed switch S1 is disposed within the encapsulated case 171. The battery 174 is provided with a case formed of an insulating material which will not short out the components on the printed circuit board. The electronic circuitry which is provided within the case 171 is connected to output terminals 176 and 177 provided on the top side of the access card 18 and are adapted to be engaged by the spring-loaded contacts 48 and 49 of the lock box.

The upper rear side of the case 171 is provided with a space in which a label 181 is placed. The label 181 carries a bar code 182 as well as a secure entry number 133 and a call-in date 184. The cover plate 172 is provided with spaced parallel notches 186 near its lower end. It also provides space for a label 187 that carries operating instructions for the access card 18.

The front side of the access card 18 (see FIG. 7) is provided with a keyboard 191 which is of the type described in co-pending application Ser. No. 899,533, filed on Aug. 22, 1986. The keyboard 191 is provided with two holes, 192 and 193 through which light emitting diodes of the type hereinafter described can be viewed. As shown the keyboard 191 contains key pads 194 for the numbers 0 through 9. It also includes a "battery test" key pad 196 which underlies the hole 192 and a "clear/start" key pad 197 which underlies the hole 193. Also included is a "set 24 hour use" key pad 198, a "set daytime only" key pad 199, a "send" key pad 201, a "remove lock box" key pad 202, an "update card" key pad 203, and an "obtain key" key pad 204.

The electronics for the lock box 17 is shown in block diagram form in FIG. 7 and shows the manner in which the electronics is connected to the contacts 176 and 177 of the access card or access card 18 through the spring-loaded contacts 48 and 49 provided in the lock box 17. The electronics, as shown in FIG. 7, includes a microprocessor 221 which can be any standard eight bit microprocessor having low power requirements. A battery B1 is provided in the housing 21 of a lithium type which provides back-up power for the memory 222 which is of a conventional type as, for example a CMOS static memory. The battery B1 also provides back-up power to a crystal controlled clock 223 which is provided with a crystal 224. The clock 223 is used to provide time and date information for the lock box 17 as hereinafter described.

As hereinbefore described, the access card 18 is provided with a reed switch S1. The reed switch is normally open and controls the energization of the contacts 176 and 177 provided on top of the access card The reed switch S1 is normally in an open position and thus no power is provided to the contacts 176 and 177 during the time the reed switch is in this position. This serves to prevent any accidental short circuits in the event the contacts 176 and 177 come into contact with the conductor when the access card 18 is not inserted into a lock box as, for example, when carried in a pocket of a user. When the access card 18 is inserted into the lock box as shown in FIGS. 1 and 2, the reed switch S1 is actuated by the magnet 141 to cause power to be supplied to the contacts 176 and 177. Typically the voltage supplied from the contacts 176 and 177 is approximately 5½ volts and is approximately twice that supplied by the lithium battery B1 inside the lock box. A diode D1 is provided in the circuitry in FIG. 7 which is reverse biased and serves to assure that the electronics in the lock box will be operated from the power provided by the battery 174 in the access card. As soon as the access card is removed from the lock box, the memory 222 and the clock 223 will revert to being operated by the back-up lithium battery B1.

A diode D2 is provided which is in series with the diode D1 and is reversed biased to prevent voltage from being supplied from the lithium battery B1 to other parts of the electronics when the access card 18 is removed from the lock box 17. This reduces the drain on the battery B1 and ensures that the battery B1 will have a long lifetime.

The contacts 176 and 177 are energized when the access card 18 is placed within the lock box and DC power 225 is supplied to a filter comprised of a diode D3 and a capacitor C1 for filtering the power supplied from the battery in the access card 18 which supplies power to the various components in the electronics in the lock box. Zener diodes D4 and D5 serve as protection diodes to protect the electronic circuitry in the lock box. In addition to the DC power 225 being supplied on the conductors 226 and 227 from the contacts 176 and 177, a high frequency pulse width modulated digital data signal 228 is supplied on a conductor 229 from the conductor 226 to a decoder detector 231. The modulated digital data signal 228 is achieved by turning the DC power on and off at a high frequency as, for example, at the 32 kilohertz frequency selected in the present invention to provide two different types of series of interruptions to transfer digital data information in the form of "0's" and "1's". Thus, for example, as shown in FIG. 7A, the "0" can be in the form of four interruptions, each having a width of time t1 which at 32 kilohertz corresponds to 16 microseconds and eight or twelve of such interruptions of time interval t1 to transmit a "1".

During the times of these interruptions, the capacitor C1 serves to supply the necessary continuous power to the lock box electronics during each interval t1 during the presence of high frequency pulse width modulation of the DC power from the access card. During the time intervals t2 shown in FIG. 7A, the six volt DC power is supplied to the line 229 and at the same time the capacitor C1 is recharged. The microprocessor 221 therefore receives uninterrupted power either from the battery in the access card or from the capacitor C1 in the lock box. At the same time the microprocessor 221 will receive any of the high frequency data in the signal 228 on the line 229. This high frequency data is unfiltered and unaffected by the capacitor C1.

In connection with the foregoing, it is desirable to keep the time t1 relatively small so as to minimize the amount of power required from the capacitor C1. The time t2 should be sufficiently large to permit the recharging of the capacitor C1. In addition, it is desirable to keep the time t1 relatively small to minimize the voltage ripple on the capacitor C1 as represented by the voltage $V_C$ shown in FIG. 7B which is approximately 5.5 volts. It can be seen that during the time t1 that the voltage on the capacitor decreases by a slight amount by approximately 20 to 25 millivolts and then is rapidly recharged to the 5.5 volt level during the time t2.

The decoder detector 231 is of a conventional type and detects and decodes the signal supplied on the conductor 229 to provide a clock signal on the conductor 232 to the microprocessor 221 and a data signal on the conductor 233 also supplied to the microprocessor 221. During the time that the access card 18 is transmitting data or commands to the lock box 17, a filter comprised of the capacitor C1 and the diode D3 filters out the high frequency signal being supplied. Thus the power being supplied to the components of the electronics is free of the high frequency components.

The microprocessor 221 is connected to control logic 234 by a conductor 236. The control logic 234 is of a type disclosed in U.S. Pat. No. 4,609,780. The control logic 234 is connected by conductors 237 and 238 to the solenoid 82 and 109 provided for the shackle 66 and the key container 86 respectively. The microprocessor 221 in addition to supplying signals to the control logic 234 supplies signals to a DTMF (dual tone multifrequency) block 241 which energizes the speaker 151. As explained in U.S. Pat. No. 4,609,780, the DTMF block 241 is utilized for transmitting data stored in the memory 222 of the lock box to a central computer. As explained previously in U.S. Pat. No. 4,609,780, the data contained in the memory 222 is converted to DTMF tones and transmitted to a central computer along with other information such as the serial number of the lock box, the time and date of the transmission and the serial number of the owner of the lock box and the serial number of the sender of the data and the identification number and time and date of each key container opening.

Figure 9:
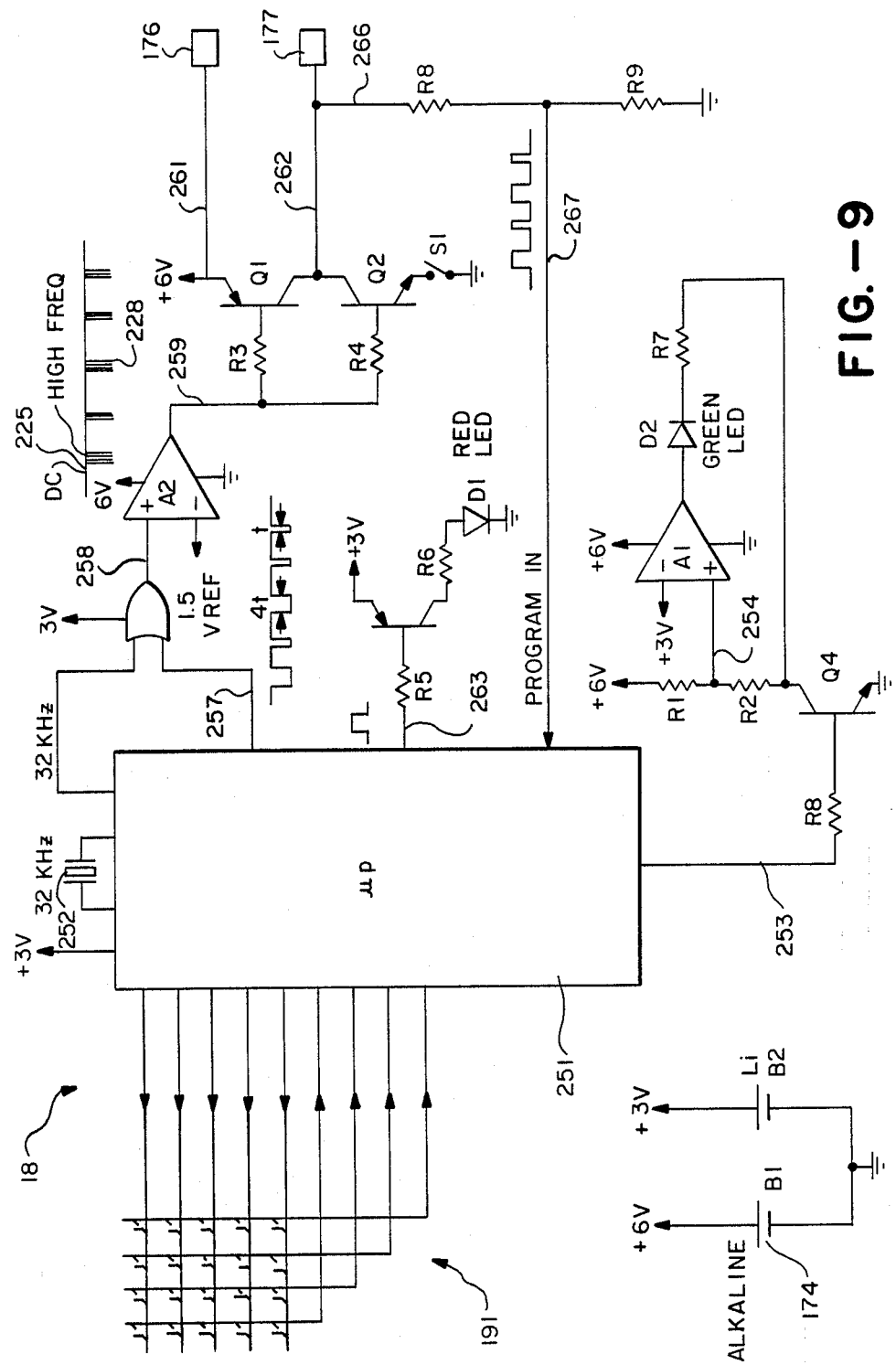
FIG. 9 is a block diagram of the electronic circuitry utilized in the access card.

In FIG. 9 there is shown the electronics for the access card, largely in block diagram form. As shown therein, the schematics include the keyboard 191, the operation of which is well known and is generally described in U.S. application Ser. No. 899,533 filed on Aug. 22, 1986. The keyboard or key pad 191 is connected to a microprocessor 251 of a conventional type. It also can be an eight bit microprocessor having low power requirements. It is provided with a crystal 252 which is utilized for providing the timing to the microprocessor and is also utilized for creating the high frequency signal 225 hereinbefore described which is utilized for communicating with the lock box 17.

The circuitry for the access card 18 includes two batteries B1 and B2 with the battery B1 providing an approximately 6 volt output and the battery B2 providing an approximately 3 volt output. The battery B1 can be the large alkaline type battery 174 hereinbefore described, whereas the battery B2 can be a relatively low power lithium-type battery having a long life. The battery B2 is designed to operate the microprocessor and the electronics within the access card and is designed to operate at very low power so that the lithium battery B2 should be capable of meeting the power requirements of the access card for a period of 5 to 6 years. The larger battery B1 or 174 is utilized for supplying power to the lock box and is a replaceable battery which can be replaced when needed. Thus the battery B1 is usually replaceable, whereas the battery B2 is not intended to be replaceable except at the factory.

A battery test circuit is provided for testing the battery B1 to ascertain when it should be replaced. The battery test circuit is activated when both the battery test button 196 and the clear/start button 197 are depressed simultaneously. This requirement for simultaneous depression of these two buttons is provided to ensure that operation of the battery test button by itself could not possibly occur accidentally in the pocket of a user and activate the test circuit and inadvertently drain the battery B1.

Upon simultaneous depression of the buttons 196 and 197 a battery test signal is supplied by the microprocessor 251 to a conductor 253 through a resistor R8 to turn on a transistor Q4. When the transistor Q4 turns on current flows through the collector and through the resistors R1 and R2. The resistors R1 and R2 serve as a voltage divider which is connected by a conductor 254 to a comparator A1. The comparator A1 utilizes the three volt output from the lithium battery B2 as its reference. Since the lithium battery has a long life, the voltage output form it is very stable and serves as a reliable reference for the comparator A1. The six volt battery voltage of the battery A1 is measured against the three volts provided by the battery B2. If the output from the battery B1 is relatively high in excess of three volts, the output from the comparator A1 goes up and supplies a signal through the diode D3 and resistor R9 to a green light emitting diode D2 identified in FIG. 9. The resistive values of the resistors R1 and R2 are chosen to be relatively low to reflect the same type of load that the battery B1 would receive in operating the lock box. If the light emitting diode D2 does not light up, this indicates that the battery B1 should be replaced.

As the pads or buttons of the keyboard 191 are depressed to supply appropriate commands to the access card, this information is supplied to the microprocessor 251. The 32 kHz high frequency output 228 from the crystal 252 is supplied by a conductor 256 to an OR gate as shown in FIG. 9. This 32 kHz frequency signal is gated by a gating signal supplied to the OR gate to an output conductor 257 from the microprocessor 251. As shown, the OR gate is supplied with a three volt signal and thus has a DC output which swings from 0 to 3 volts which is supplied through a conductor 258 to a comparator A2. The comparator A2 is provided for translating the 0 to 3 volts swings provided by the OR gate to 0 to 6 volt swings so that it can be used with the 6 volt output from the alkaline battery 174 or B1. The comparator A2 is provided with a 1.5 volt reference and provides a high frequency pulse width modulated signal on the DC which swings between 0 and 6 volts.

The signal from the conductor 257 to the OR gate is in digital form as shown in FIG. 9. The signal supplied by the comparator A2 is supplied by a conductor 259 to two base current limiting resistors R3 and R4 which are connected to the bases of transistors Q1 and Q2 in which Q1 is a PNP transistor and Q2 is a NPN transistor connected in a push-pull configuration. As can be seen, the transistors Q1 and Q2 are connected to the 6 volt battery supply and can only be energized when the reed switch S1 is operated to supply output signals to the contacts 176 and 177 provided on the exterior of the access card 18. When the reed switch S1 is open when the access card 18 is not in the lock box 17, even though the output of the comparator A2 is attempting to turn on the transistor Q2 no base current can flow nor can collector current flow because the reed switch S1 is open. As soon as the access card 18 is placed in the lock box 17, the reed switch S1 closes. The positive 6 volts is normally connected to the contact 176 but the negative contact 177 is not energized until it is connected to ground when the transistor Q2 is turned on thereby creating approximately 6 volts across the contacts 176 and 177. If a signal is present on the output of the comparator A2 which contains data or a command from the microprocessor 251, the transistors Q1 and Q2 are turned off in an appropriate manner to create a high frequency power signal across the contacts 176 and 177. This power signal is deciphered by the lock box electronics hereinbefore described and decoded by the microprocessor in the lock box to determine the operations to be performed.

The microprocessor 251 is provided with a second output 263 in addition to the output 257 which is connected to a resistor R5 to the base of a transistor Q3. The microprocessor 251 supplies an output on the line 263 each time a key is depressed on a keyboard 191. When the transistor Q3 is turned on it drives a red light emitting diode D1 through a current limiting resistor R6. A resistor R5 limits the base current for the transistor Q3.

The contacts 176 and 177 are connected by the conductors 261 and 262 to the transistors Q1 and Q2. A conductor 266 is connected to the conductor 262 which is connected to ground through two resistors R8 and R9 with a "program in" line 267 being connected between the resistors R8 and R9 and to the microprocessor 251. This circuitry permits data to be sent to the microprocessor 251 to program the microprocessor, as for example, the serial number identity of the access card and other information important to the operation of the access card. This permits the microprocessor 251 to be programmed from an external programmer by supplying information in pulse width modulated form. The microprocessor 251 can be readily placed in a receive mode or in a program mode by pressing the clear/start button 197 and then by depressing the send button 201. This places the access card in the program mode and places it in a condition in which it can accept data and decode that data to update its memory as well as other functions. This "program in" line 267 is only used to initialize the card with the serial number and other pertinent bits of information that it needs for its operation. The access card thereafter can be updated from the keyboard 191 as described in co-pending application Ser. No. 899,533 filed on Aug. 22, 1986.

Another embodiment of the electronic circuitry for a lock box 17 which does not require the use of an internal battery is shown in FIG. 8. In the embodiment of the circuitry for the lock box shown in FIG. 7, the circuitry shown required the use of an internal back-up battery because of the static CMOS ram which was used for the memory 222. As is well known to those skilled in the art, such a memory requires a continuous application of power to it to maintain the memory. In FIG. 8, in place of the static CMOS ram memory 222 there is provided a memory 271 which does not require the use of a back-up battery. It is an EEPROM (electrically erasable programmable read-only memory). This type of memory as is well known to those skilled in the art is provided with a memory which can be erased and rewritten and which does not require any back-up power for maintaining the data in the memory. Also to eliminate the need for a battery in the electronic circuitry of the lock box, the clock and time keeping function performed by the clock in the lock box 17 is removed from the lock box and this function is performed by the access card 18. Thus the need for the crystal controlled clock 223 provided in FIG. 7 is eliminated. This clock and time keeping function as it is performed by the access card 18 as hereinafter be described. The remainder of the circuitry shown in FIG. 9 is substantially identical to that which is shown in FIG. 7.

Similarly, the circuitry for the access card which is used for performing the timekeeping function for the lock box is substantially identical to that shown in FIG. 8 with the exception that the microprocessor is provided with an internal real time clock which is incorporated in the firmware to provide time and date information.

Operation and use of the access card 18 and the lock box 17 shown in FIGS. 7 and 9 may now be briefly described as follows. Let it be assumed that it is desired to obtain access to a key container. To accomplish this the access card 18 is inserted into the lock box in the manner hereinbefore described. The user's four digit private code is then inserted into the access card and the "obtain key" button is depressed. During that transaction the access card transmits to the lock box who the person is, the serial number of the access card and the update code and also the function code for opening the key container. The access card responds to that information by actuating the solenoid for releasing the key container and also records the time and date and the identity of the access card for later transmission.

Operation and use of the access card 18 and the lock box 17 shown in FIGS. 8 and 9 may now be briefly described as follows. Let it be assumed that it is desired to obtain access to a key container. To accomplish this the access card 18 is inserted into the lock box 17 in the manner hereinbefore described. The user's four digit private code is then inserted into the access card and the obtain key button is depressed. During that transaction the access card in addition to selling the box who the person is, the serial number of the access card and the update code and the function code for opening the key container, the access card will also send an additional series of 1's and 0's that would supply the time and date information to the lock box. The time and date information would be supplied to the access card at the time of initialization of the access card. There is no capability for the user to change the time and date in the access card.

It can be seen that by use of lock boxes and access cards of the type hereinbefore described it has been possible in certain embodiments to reduce the dependence on batteries in the lock box to a very small long-life back-up battery when CMOS rams are utilized in the memory and can be eliminated entirely when EE-PROMS are utilized for the memory.

In many applications of the electronic lock box, access card system and method, it is typical that a group of identification numbers would be utilized for providing access to the containers of the lock boxes limited to a single real estate board such as a multiple listing real estate board. In such arrangements, a real estate agent can only obtain access to lock boxes in the system of that real estate board. The agent would not be able to obtain access to lock boxes in the system of another real estate board. This ensures that unauthorized entry from real estate agents of other boards cannot obtain access to the lock boxes of another real estate board.

However, it should be appreciated that there are situations in which it may be desirable to have agents from different real estate boards have access to the lock boxes of other real estate boards. This is particularly true in metropolitan areas which occur on the East Coast and West Coast of the United States in which there are multiple listing real estate boards in close proximity to each other. In such areas, it is often desirable that a real estate agent be able to show properties that are listed under adjacent real estate boards. This capability can be obtained with the present electronic lock boxes, access card system and method by programming the access card or access cards with group identification numbers of the authorized groups. This could be as few as one or as many as 15 to 20 different groups. Thus the lock boxes for each group would be programmed with a unique group identity which could be in the form of a three or four digit code. With a access card so programmed, when a real estate agent is attempting to obtain access to a lock box, a access card when inserted into a lock box will send all of the group identification numbers which have been placed in the access card to the lock box during a transaction. If the lock box group identification number is contained in the transmission from the access card or the access card or card, the lock box will permit access to its key container, if the access card also transmits an update code that is current.

To accomplish the entering of group identification numbers into the access card or an access card, the software which is utilized for initializing the access card includes the group identification numbers to which the real estate agent is to have access. With the access card or access card programmed in this manner, a typical transmission from the access card to a lock box would be as follows.

| XXXXXXXX | xxxx | xxxxxxxxxx | xxxxx |
|---|---|---|---|
| Group ID | S/N | Agent Name | Time/Date |
| xxx xxx xxxx | xxxx | xx | xx |
| Agent Tel No. | Update Code | Check Sum | Operate/Function Code |

All of the above can be transmitted in ASCII characters with the group identification utilizing up to eight digits, the serial number utilizing up to four digits, the agent's name up to 10 digits, the time and date, the agent's telephone number, the update code which is in the computer from the group identification number and the serial number which tells the lock box whether or not the agent's access card is a current or valid card. This is followed by a check sum to check the validity of the transmission and a two-digit operate code or function code. This instructs the lock box as to whether it is to permit opening of the key container or removal of the shackle of the lock box or other desired function. In other words, this last code is a function code.

By programming the access card or access card 18 in this manner, the agent is unaware of these additional pieces of information being supplied from the access card to the lock box. The agent merely punches in his or her four digit personal access code or ID number and presses the appropriate function key on the access card to accomplish the desired function as, for example, opening of the key container or removal of the shackle.

It should be appreciated that in connection with the above in the one embodiment of the invention where the time and date information is contained in the lock box the time and date information would not be transmitted from the access card. It is only in those situations where there is no battery in the lock box and no timekeeping function in the lock box that the time and date information is transmitted from the access card.

In the event it is desired to utilize a access card or access card which has been provided with a visual display of the type disclosed in application Ser. No. 899,338 filed on Aug. 22, 1986, the lock box during a transaction would supply to the access card the serial number, the agent's telephone number, the agent's name and time and date of each transaction. In addition, the box would identify its own serial number, the owner's name and telephone number. The person who owns the lock box in a real estate application might be the listing agent or the broker. Also transmitted could be the time and date of the transmission from the lock box to the access card to provide a record when the lock box was interrogated. In addition, the lock box could also transmit its own group identification number.

It is apparent from the foregoing that there has been provided an electronic lock box, access card, system and method which has many advantages. They are particularly advantageous in applications where reliance on battery power in the lock boxes is undesirable. The lock box has been constructed in such a manner so the shackles can not be removed and access obtained to the key containers. By the use of group identification numbers, it is possible to permit real estate agents from one board to have access to the lock boxes of one or more additional real estate boards.

What is claimed is:

1. In a lock box for use in a secure entry system, a housing, access means mounted in said housing movable between accessible and inaccessible positions, spring operated latch means for retaining said access means in an inaccessible position and movable between latched and unlatched positions, means for moving said spring operated means to an unlatched position and safety means engaging said spring operated latch means to prevent obtaining access to the access means by hammer blows being applied to the housing.

2. A lock box as in claim 1 wherein said means for moving said spring operated latch means to an unlatched position includes solenoid operated means for moving said spring operated means in one direction and wherein said safety means operates when a hammer blow is applied to the housing in a direction which is opposite the first direction in which the solenoid operated means applies force to the spring operated latch means.

3. A lock box as in claim 1 wherein said access means is in a key container having a pin mounted thereon, said pin having a recess formed therein and wherein said spring operated latch means includes a member movable into and out of said recess in moving from a latched position to an unlatched position.

4. A lock box as in claim 2 wherein said safety means has a mass which is greater than the mass of the spring operated latch means.

5. A lock box as in claim 3 wherein said safety means comprises a latch member movable in the housing in a direction substantially parallel to the movement of the spring operated latch means, cooperative detent means carried by the housing and the latch member and movable into a latched position upon the hammer blow being applied to the housing in said first direction, said latch member and said pin including cooperative means for retaining said pin when said latch member moves to a latched position.

6. A lock box as in claim 5 together with means for moving said latch member to an unlatched position after it has moved into a latched position.

7. In a lock box for use in a secure entry system, a housing, access means mounted in said housing movable between accessible and inaccessible positions, circuitry within the housing for controlling the movement of the access means, said circuitry including means for receiving DC power, said means for receiving DC power including a filter having a capacitor, said circuitry being capable of receiving high frequency pulse width modulation on the DC power, said capacitor serving to supply at least some of the power required by the circuitry during the time pulse width modulation is occurring on the DC power.

8. A lock box as in claim 7 wherein the circuitry in the lock box is capable of receiving high frequency pulse width modulated DC power in the form of two separate and different series of interruptions of the DC power and wherein each of the interruptions extends over a period of time which is substantially less than the time required to discharge the charge on the capacitor by a substantial amount.

9. A lock box as in claim 8 wherein the circuitry includes a microprocessor and wherein the microprocessor receives its DC power from the means for receiving DC power.

10. In a secure entry system, a plurality of lock boxes each having a housing and a container therein movable between accessible and inaccessible positions, circuitry within the housing for controlling the movement of the container, a plurality of access cards, each access card having a keyboard, a battery mounted therein for supplying DC power and electronic circuitry coupling the battery to the keyboard and means carried by each lock box and by each access card for establishing electrical contacts between the access card and the lock box for supplying DC power from the battery in the access card to the circuitry in the lock box to operate the circuitry in the lock box.

11. A system as in claim 10 wherein each access card has a pair of contacts, normally open switch means in the access card connected to said pair of contacts for preventing power from the battery to the access card to be supplied to the contacts and wherein said lock box includes means for moving the switch means from a normally open position to a normally closed position when the access card is mated with a lock box.

12. A system as in claim 11 wherein said switch means is a magnetic reed switch and wherein said means carried by the lock box for operating the switch means is a magnet.

13. A system as in claim 10 wherein said lock box includes a memory requiring a continuous power supply together with a back-up battery mounted in the lock box for supplying power to the memory.

14. A system as in claim 10 wherein said lock box includes a memory which does not require continuous application of power to retain its memory.

15. A system as in claim 13 wherein means is provided within the lock box to provide a time keeping function.

16. A system as in claim 14 wherein said lock box is without its own timekeeping function and wherein said access card is provided with a timekeeping function.

17. A system as in claim 10 wherein said lock box is provided with a group identification number and wherein each of said access cards is provided with at least one group identification number.

18. A system as in claim 17 wherein each access card is provided with a plurality of group identification numbers.

19. A system as in claim 10 together with a filter including a capacitor coupled to the battery and means for modulating the DC power from the battery at a high frequency to transfer data on the DC power and wherein the capacitor supplies power to the circuitry in the lock box during at least portions of the time that data is being transferred on the DC power.

20. A system as in claim 19 wherein said means for transferring data on the DC power includes means for pulse width modulating the DC power.

21. A system as in claim 20 wherein said means for modulating the DC power includes means for periodically interrupting the DC power to provide two different series of interruptions to indicate "0's" and "1's" for digital data transfer.

22. A system as in claim 21 wherein the length of time of each of the interruptions is substantially less than the time required to substantially reduce the charge on the capacitor so that the capacitor can supply power to the circuitry in the lock box during the periods of interruptions of DC power.

23. In an access card for use in a secure entry system of the type having a lock box including means for operating a switch, the access card comprising a case, a pair of contacts carried by the case, keyboard means carried by the case, a battery mounted in the case, electronic circuitry within the case connected to the keyboard means and the battery, said electronic circuitry including means for providing a timekeeping function, an additional battery carried by the case, and normally open switch means disposed in the case and connected to said pair of contacts, to said additional battery and to said electronic circuitry in the case, said normally open switch means being adapted to be operated by the means for operating a switch in the lock box when mated with a lock box in the secure entry system.

24. A access card as in claim 23 together with battery test means carried by the case for testing when the additional battery needs to be replaced.

25. A access card as in claim 23 wherein said additional battery supplies a voltage which is greater than that of the first named battery and wherein said battery test means includes comparator means using the voltage from the first named battery as a reference to ascertain when the additional battery needs to be replaced.

26. A access card as in claim 23 wherein said electronic circuitry includes a microprocessor and wherein said microprocessor generates a pulse width modulated high frequency signal which carries information which is superimposed upon the DC power supplied by the additional battery which serves as a carrier.

27. In a method for operating a secure entry system which includes a plurality of lock boxes having access means movable between accessible and inaccessible positions and electronic circuitry for controlling the movement of the access means and a plurality of access cards with each of the access cards having a keyboard and electronic circuitry connected to the keyboard and means for establishing electrical contact between an access card and a lock box, the method comprising establishing a timekeeping function in the access card and supplying power from the access card for operating the electronics in the lock box.

28. A method as in claim 27 together with the step of supplying all of the power for the lock box from the access card.

29. A method as in claim 27 together with the step of providing timekeeping functions for the lock box and the access card solely from the timekeeping function in the access card.

30. A method as in claim 27 together with the steps of supplying DC power to the lock box from the access card and supplying data from the access card to the lock box by modulating the DC power at a high frequency.

31. A method as in claim 30 wherein said high frequency modulation is supplied as pulse width modulation.

32. A method as in claim 30 together with the step of modulating the DC power by periodically interrupting the DC power at high frequency to provide two different series of interruptions to convey digital information in the form of "0's" and "1's".

33. A method as in claim 32 together with the step of storing power between the interruptions of DC power and supplying stored power to the electronic circuitry in the lock box during the interruptions.

* * * * *